April 2, 1963  E. L. DETWIELER  3,083,950
BOAT TRAILER DOLLY
Filed Feb. 19, 1960  2 Sheets-Sheet 1
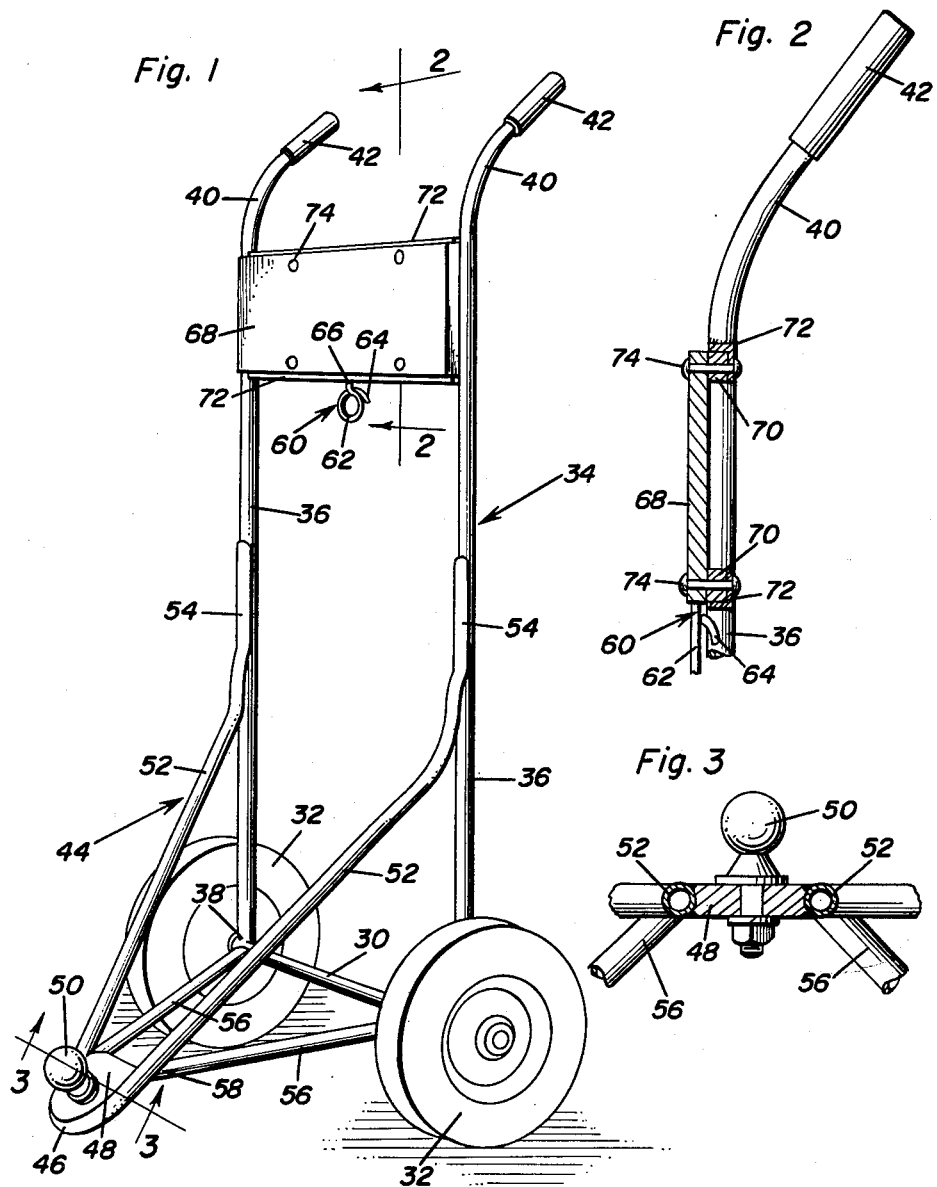
Edward L. Detwieler
INVENTOR.

April 2, 1963
E. L. DETWIELER
3,083,950
BOAT TRAILER DOLLY
Filed Feb. 19, 1960
2 Sheets-Sheet 2
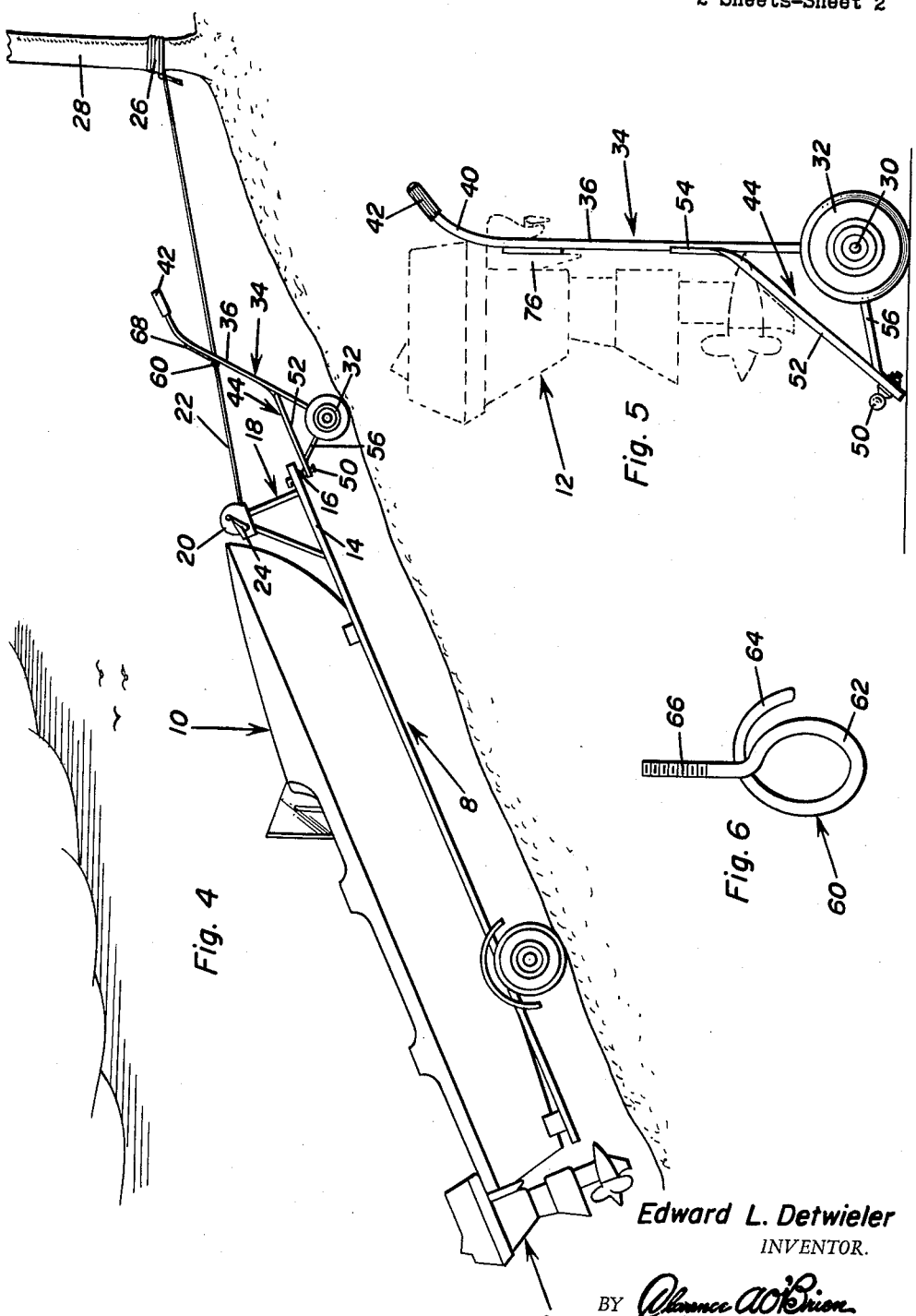
Edward L. Detwieler
INVENTOR.
BY *Clarence A. O'Brien*
*and Harvey B. Jacobson*
Attorneys

United States Patent Office 3,083,950
Patented Apr. 2, 1963

3,083,950
BOAT TRAILER DOLLY
Edward L. Detwieler, 1203 S. 19th St., St. Joseph, Mo.
Filed Feb. 19, 1960, Ser. No. 9,947
5 Claims. (Cl. 254—166)

This invention relates to an improved manually maneuverable structurally novel dolly, resembling a conventional-type two-wheeled truck, but expressly designed, balanced and engineered for effectually towing and otherwise handling and moving a boat trailer, for example, where the approach to the beach or water is inclined and the surface is rocky and otherwise irregularly contoured and difficult to ascend and descend.

As is well known, a suitable trailer, generally two-wheeled, is customarily employed in transporting a boat mounted thereon and has an appropriate draft tongue at the front provided with a hitching socket which is connectible with a complemental hitching ball provided therefor at the rear end of an automobile or other tow-type vehicle. Not only is the automobile used for transporting the boat-laden trailer to and from a beach; it is also employed when moving the trailer to and from the water's edge. However, many an approach to the desired beach is a steep incline or the like which may not lend itself to safe use of an automobile. Therefore, where the conditions are risky and dangerous, hand power has to be resorted to. A problem is thus posed and, without aid, one man may not be able to cope with it successfully.

An object of the instant invention is to provide, as above suggested, a simple, practical and reliable two-wheeled hand truck or dolly which may be readily hitched to the draft tongue of the trailer whereby to permit the same to be readily and reliably handled while ascending or descending the surface traversed.

Briefly summarized, the concept has to do with a two-wheeled boat transporting trailer which may be of any suitable and commercially acceptable construction, the boat being mounted atop the trailer in the usual way. The trailer is provided at its leading end with an extension or draft tongue which projects forwardly beyond the bow of the boat, the same being provided at its terminal and on the underside with a fixed coupling or hitching socket member. Attached to and rising vertically from the upper side of the tongue is a cable-equipped winch. The improved maneuvering and handling dolly is characterized by a wheel-supported axle to which the side members of a main frame are joined. Appropriate handle means is provided at the upper end of the main frame. In practice the main frame is inclined forwardly and upwardly relative to the horizontal plane of the trailer. The lower truck portion of the dolly is constructed to provide a truss-like drawbar the outer terminal portion of which has a fixed hitching ball which is swivelly connected with the socket member.

In carrying out the desired improvements the truss-like drawbar is of novel construction. More specifically, a V-shaped yoke functions as an auxiliary frame and the diverging arms are connected with intermediate portions of the side members of the main frame, said auxiliary frame being disposed at an oblique angle relative to the plane of the main frame. Suitable braces between the apical portion of the auxiliary frame and wheel-supported axle insure rigidity and an over-all well balanced dolly.

Another and important aspect of the invention has to do with guide means fixedly mounted on the upper central portion of the main frame. This guide means serves to permit a median portion of the cable from the winch to be guidingly passed therethrough whereby to permit the free end portion of the cable to be moored on a tree or other stationary support. Under the circumstances, the assemblage may be moved up or down the incline by properly paying out or reeling in the winch cable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the improved trailer towing and handling dolly;

FIG. 2 is a fragmentary view in section and elevation taken on the plane of the line 2—2 of FIG. 1;

FIG. 3 is a section on the line 3—3 of FIG. 1 suitably enlarged;

FIG. 4 is a view in side elevation illustrating the dolly, boat trailer, winch and cable combination in use;

FIG. 5 is a side elevation on a small scale showing how the truck or dolly is also used for supporting and carting an outboard motor; and FIG. 6 is a view in perspective of a cable attaching and guide eye used as a component part of the truck or dolly.

With reference first to FIG. 4 the aforementioned two-wheeled boat trailer, which may be of any suitable construction (not detailed) is denoted by the numeral 8. The boat supported thereon is denoted at 10 and the outboard motor, which is suspended on the stern, is denoted at 12. The forward extension of the trailer frame which constitutes the draft tongue is denoted at 14 and is provided with the usual socket member or female hitch 16. The windlass, including the stand, is denoted by the numeral 18 and is attached and rises perpendicularly from the tongue and has the customary spool or reel 20 for the cable 22 and an operating crank 24. The free or forward end of the cable is shown tied or moored as at 26 on a tree 28. The expression "tree" is used here to designate any convenient stationary object which may be used for cable mooring in lieu of a tree.

The dolly or truck comprises a horizontal axle 30 with wheels 32 mounted thereon and it is to this axle that the aforementioned main frame 34 is connected. More specifically, the side members or frame bars 36 are linearly straight, coplanar and in spaced parallelism and have their lower end portions 38 joined rigidly to the axle 30 inwardly of the wheels 32. The upper curvate ends 40 are provided with suitable handles or hand-grips 42. The truck portion of the dolly is of great significance here and unlike the usual lip or rack seen on trucks of this character is of special construction. In an over-all or unitary sense it may be classified as a truss-like construction and it functions as a support and drawbar. More in particular, this drawbar comprises an auxiliary frame 44 which is preferably a one-piece yoke constructed from rigid steel tubing. This yoke or frame is V-shaped and the vertex or apical end portion 46 is rounded and embraces the marginal edge portions (FIG. 3) of an anchor plate 48 which is welded coplanar therewith and serves as a base for the ball joint or male hitching ball 50. Obviously, this ball is made to be swively coupled or joined to the aforementioned socket member or hitch 16 as illustrated in FIG. 4. The rearwardly diverging arms 52 have end portions superimposed on and welded to the median portions of the side members 32 denoted generally at 54. The stabilizing brace means comprises a pair of divergent tubular braces 56 having their divergent ends joined to the end portions of the axle 30 and their converging end portions joined as at 58 to the converging ends of the arms 52. The brace means is at a right angle to the axes of the side members 36. The auxiliary frame 44 is at an oblique angle. Thus, these several main parts, the main frame 34, auxiliary frame 44 and brace means provide a well balanced reliably rigid drawbar which assumes a substantially horizontal position when in use in FIG. 4 thus disposing the main frame at an upwardly and forwardly inclined angle.

With further reference to FIG. 4 it will be seen that the main frame is caused to ride along the tautened cable 22. This is accomplished by providing the main frame with suitably elevated centralized guide means generally denoted by the numeral 60. Specifically, this means comprises a pigtail coil which provides a cable guide eye 62 and an offset hooked terminal 64 which facilitates threading the cable through the eye. The part 60 might also be referred to as a screw eye in that it has a screw-threaded shank 66 which is screwed into a socket provided therefor in a rigid cross plate or panel 68. This panel rests on filler strips 70 seated in spaces provided therefor in the upper and lower angle irons 72. These several parts 68, 70 and 72 are fastened together by suitable fasteners or rivets 74.

With this construction and arrangeemnt by mooring or tying the cable at 26 on the tree or other support 28 the coupled truck or dolly is caused to track along with the trailer. Consequently, by using the winch and hand crank the assemblage seen in FIG. 4 may be lowered down the incline or hauled up the incline in an obvious and expedient manner. When the cable is unattached the dolly may be used on substantially flat ground for suitably guided pushing and pulling by hand.

As seen in FIG. 5 the truss-like drawbar may be utilized as a stand or prop permitting the main frame to stand up while attaching or removing the outboard motor. The boat clamps 76 may be hung and suspended from the panel 68 and suitable braced, thus making it possible to conveniently cart and transport the outboard motor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a two-wheeled boat transporting trailer, a boat mounted on the trailer, the leading end of said trailer extending forwardly beyond the bow of the boat and providing a draft tongue and being equipped with a fixed hitching socket, a cable-equipped winch vertically supported on and fixed to the draft tongue, a dolly embodying a wheeled main frame having coplanar side members provided with hand-grips, said main frame being inclined forwardly and upwardly relative to the horizontal plane of the trailer, an auxiliary frame rigidly secured to said main frame and provided with rigidifying braces and disposed at an angle lateral to the plane of the main frame, providing a truss-like drawbar, and having a fixed hitching ball swivelly connected with said socket and adapted to assume a generally horizontal trailer transporting position below but approximately parallel with the draft tongue, and the upper central portion of said main frame having a fixed cable holder and guide slidably embracing and encircling said cable.

2. In combination, a two-wheeled boat transporting trailer, a boat mounted on the trailer, the leading end of said trailer extending forwardly beyond the bow of the boat and providing a draft tongue and being equipped with a fixed hitching socket, a cable-equipped winch vertically supported on and fixed to the draft tongue, a dolly embodying a wheeled main frame having coplanar side members provided with hand-grips, said main frame being inclined forwardly and upwardly relative to the horizontal plane of the trailer, an auxiliary frame rigidly secured to said main frame and provided with rigidifying braces and disposed at an angle lateral to the plane of the main frame, providing a truss-like drawbar, and having a fixed hitching ball swivelly connected with said socket and adapted to assume a generally horizontal trailer transporting position below but approximately parallel with the draft tongue, and means carried by said main frame above the plane of the auxiliary frame for slidingly embracing, guidingly, and operatively connecting the dolly with the winch cable.

3. In combination, a two-wheeled boat transporting trailer, a boat mounted on the trailer, the leading end of said trailer extending forwardly beyond the bow of the boat and providing a draft tongue and being equipped with a fixed hitching socket, a cable-equipped winch vertically supported on and fixed to the draft tongue, a dolly embodying a wheeled main frame having coplanar side members provided with hand-grips, said main frame being inclined forwardly and upwardly relative to the horizontal plane of the trailer, an auxiliary frame rigidly secured to said main frame and provided with rigidifying braces and disposed at an angle lateral to the plane of the main frame, providing a truss-like drawbar, and having a fixed hitching ball swivelly connected with said socket and adapted to assume a generally horizontal trailer transporting position below but approximately parallel with the draft tongue, and means carried by said main frame above the plane of the auxiliary frame for slidingly embracing, guidingly, and operatively connecting the dolly with the winch cable, said means comprising a guide eye fixedly suspended from a rigid cross-panel, said panel spanning the space between the upper end portions of the side members of the main frame and being secured to said side members, said panel having the additional function of a hanger and support for an outboard motor.

4. In combination, a two-wheeled boat transporting trailer, a boat mounted on the trailer, the leading end of said trailer extending forwardly beyond the bow of the boat and providing a draft tongue and being equipped with a fixed hitching socket, a cable-equipped winch vertically supported on and fixed to the draft tongue, a dolly embodying a wheeled main frame having coplanar side members provided with hand-grips, said main frame being inclined forwardly and upwardly relative to the horizontal plane of the trailer, an auxiliary frame V-shaped in plan and rigidly secured to said main frame and provided with rigidifying braces and disposed at an angle lateral to the plane of the main frame, providing a truss-like drawbar, and having a fixed hitching ball swivelly connected with said socket and adapted to assume a generally horizontal trailer transporting position below but approximately parallel with the draft tongue, and the upper central portion of said main frame having a fixed cable holder and guide, whereby the free end portion of the winch cable may be passed through said guide and utilized to support the upper portion of said main frame when said cable is tensioned to pull said trailer and said dolly upwardly over irregular terrain.

5. In combination with a boat trailer having a forwardly projecting tongue provided with a socket hitch element on the forward end thereof and a vertically supported cable equipped winch, a hand truck comprising a generally V-shaped frame comprising a pair of divergent arm portions joined together at corresponding ends forming an apex, ground engaging support wheels journalled from said apex about an axis extending transversely of said frame at substantially right angles to the plane in which said arm portions are disposed, ball hitch means on the free end portion of one of said arm portions swivelly secured to said socket hitch element, and guide means on the free end portion of the other of said arm portions slidably guiding and embracing the free end of said cable.

References Cited in the file of this patent

UNITED STATES PATENTS

| | | |
|---|---|---|
| 2,708,045 | Shontz | May 10, 1955 |
| 2,723,130 | Andrews | Nov. 8, 1955 |
| 2,745,673 | Koepke | May 15, 1956 |
| 2,792,233 | Stackhouse | May 14, 1957 |
| 2,844,389 | Burnett | July 22, 1958 |

FOREIGN PATENTS

| | | |
|---|---|---|
| 452,544 | Canada | Nov. 9, 1948 |